United States Patent
Bhattacharjee et al.

(10) Patent No.: US 7,433,399 B2
(45) Date of Patent: Oct. 7, 2008

(54) METHOD AND APPARATUS FOR GENERATING COEFFICIENTS IN CONTINUOUS TIME EQUALIZERS

(75) Inventors: Jishnu Bhattacharjee, San Jose, CA (US); Debanjan Mukherjee, San Jose, CA (US); Abhijit Phanse, Sunnyvale, CA (US)

(73) Assignee: Scintera Networks, Inc., San Jose, CA (US)

( * ) Notice: Subject to any disclaimer, the term of this patent is extended or adjusted under 35 U.S.C. 154(b) by 770 days.

(21) Appl. No.: 10/970,470

(22) Filed: Oct. 20, 2004

(65) Prior Publication Data

US 2006/0083296 A1    Apr. 20, 2006

(51) Int. Cl.
*H03H 7/30* (2006.01)
*H03H 7/40* (2006.01)
*H03K 5/159* (2006.01)

(52) U.S. Cl. .................................................. 375/232
(58) Field of Classification Search .................. 375/232
See application file for complete search history.

(56) References Cited

U.S. PATENT DOCUMENTS 6,587,504 B1 * 7/2003 Murakami et al. .......... 375/232
7,068,736 B2 * 6/2006 Farrow ....................... 375/321

* cited by examiner

*Primary Examiner*—David C. Payne
*Assistant Examiner*—Nader Bolourchi
(74) *Attorney, Agent, or Firm*—MacPherson Kwok Chen & Heid, LLP.; Tom Chen (57) ABSTRACT

Systems and methods are disclosed to adaptively generate coefficients for continuous time least mean square error equalizers and to correct offset in high-gain amplifiers. An adaptive coefficient generator includes a bank of individual coefficient generators, each utilizing a first adaptive correction signal for a first correction and a second adaptive correction signal for a second more precise correction. The adaptive correction signals for offset correction can be a current or voltage. The first adaptive correction signal is set by maintaining the second adaptive correction signal constant, such as setting it to zero, and adjusting the first signal until the magnitude of the coefficient is minimized. The second adaptive correction signal is then set by maintaining the first adaptive correction signal at its set value by adjusting the second signal until the magnitude of the coefficient is again minimized.

21 Claims, 5 Drawing Sheets

METHOD AND APPARATUS FOR GENERATING COEFFICIENTS IN CONTINUOUS TIME EQUALIZERS

TECHNICAL FIELD

This invention relates generally to communication systems and, more particularly, to coefficient generation in continuous time equalizers.

BACKGROUND

Communications systems often employ adaptive equalization to compensate for the distortion effects of changing channel conditions and disturbances on the signal transmission channel. The equalization process, for example, may estimate the transfer function of the transmission channel and apply the inverse of the transfer function to the received signal so as to reduce or eliminate distortion effects.

Channel equalization typically employs filters that remove amplitude and phase distortions resulting from a frequency dependent time variant response of the transmission channel, for example, to thereby provide improved symbol detection capability. The channel equalization may remove baseband intersymbol interference (ISI) caused by transmission channel disturbances, including the low pass filtering effect of the transmission channel. ISI may cause the value of a given symbol to be distorted by the values of preceding and following symbols, and essentially represents symbol "ghosts" because ISI may include advanced and delayed symbols with respect to a reference symbol location in a given decision region.

An adaptive equalizer may be viewed as a digital filter with an adaptive response to compensate for channel distortions. Several well-known algorithms are available for adapting the filter coefficients and thereby the filter response to converge the equalizer.

Significant effort has been spent enhancing adaptation algorithms for use in data transmission, whether over communication systems or from storage mediums. Such adaptation algorithms typically are employed to compensate for distortions introduced into the signals by the transmission medium through which the signals have traveled. Such transmission mediums might comprise, for example, optical networks, wireless networks, standard public switch telephone networks, or even storage media where the signals have been stored and transmitted through interfaces to a user.

In all of these situations, the media through which the signal is transmitted or in which the media is stored may, in fact, affect the contents of the signal. Accordingly, equalization systems are generally employed to place the signal as nearly as possible in its original form. However, because the exact nature of this distortion as to which the signal is subjected to may not be known at the receiving end, the structure and methods employed to equalize the received signals necessarily involve certain assumptions.

Typically, the techniques for enhancing the adaptation algorithms focus on the value of the signal at the time the signal is sampled in discrete time implementations. However, very limited effort has been spent with respect to continuous time adaptation for continuous time delay line equalizers.

One technique which has been used to adapt the feedforward equalizer to compensate for signal distortion due to the transmission or storage media is known as discrete time least mean square based adaptation. A typical continuous time least mean square ("LMS") based adaptation is applied to the feedforward equalizer followed by decision feedback. This technique can be expressed as:

$$c_i(t) = \int_0^t \mu \cdot e(\tau) \cdot s_i(\tau) \cdot d\tau \tag{1}$$

where:
- $\mu$ is an adaptation parameter;
- $c_i$ denotes the $i^{th}$ tap either feed forward or feedback;
- $s_i(\tau)$ denotes the sampled input signal appropriately time aligned as applied to the $i^{th}$ tap; and
- $e(\tau)$ denotes an error signal, such as the difference between the output of a timing control circuit and a feedback signal.

One problem with this form of the adaptation is "coefficient drift" associated with decision-directed fractionally spaced equalizers. For decision-directed equalizers, "coefficient drift" can be a serious problem for a number of reasons. For example, the coefficient vector c with coefficients $c_i$ satisfying the above equation can be c or −c. Furthermore, with enough taps, the feedforward equalizer coefficient vector can be shifted either left or right (i.e., the effective group delay change of the feedforward equalizer) with the same performance.

The generic coefficient-update equation in continuous time LMSE equalizers can be given as follows:

$$c_i(t) + T\frac{d}{dt}c_i(t) = \beta c_i(t) + \mu \cdot e(t) \cdot s_i(t) \tag{2}$$

where T is the time-constant parameter, $\mu$ is the adaptation gain parameter and $\beta$ is the leakage parameter. Note that when $\beta=1$ (representing no leakage), the equation simplifies to the previous integral equation. The coefficient-drift problem can be minimized with tap-leakage.

In general, a significant challenge within a communication system (e.g., a telecommunication network or a data retrieval system) has been the application of channel parameter measurement and performance monitoring techniques. These techniques are desired to assist with maintenance of the communication system and/or quality of service and possibly provide fault detection and isolation.

For example, the techniques may be utilized to provide relevant information or take remedial action during set-up or provide system optimization to enhance throughput, reliability, and/or monitor the health within the communication system on a real-time basis. It may also be important to have a measure of the quality of the signal to prevent any degradation in the quality of service through any path of the communication system.

Thus, adaptively changing the coefficients allows the system to compensate for the various changes in the signal, such as discussed above. Adaptive coefficient generators may be used to provide appropriate coefficients to a feedforward or feedback filter or equalizer. The adaptive coefficient generators changes the coefficients based on an input signal, such as an information or data signal s(t), and an error signal, which may be an iterative feedback error signal e(t). However, for LMS adaptation of coefficients, input signals s(t) and e(t) are ideally uncorrelated, i.e., the average value of the product is zero at the converged state, with optimal coefficients s(t) and e(t) uncorrelated. This would require infinite effective loop gain and hence translate to infinite gain requirement for the coefficient adaptation block. The high gain requirement poses a very severe constraint, e.g., resulting from mismatches in differential circuit topologies. Nominally identical devices suffer from random mismatches, and the problem worsens with the scaling of CMOS technology.

One possible way for correcting offsets is to use digital-to-analog converters (DACs). But, high device offsets, along with high gain, increases the range and resolution requirement of the DAC. Note that offsets need to be corrected at the power-up of the IC only, as in continuous-time mode, there is no way to distinguish between the adapted coefficient and the offset.

Accordingly, it would be desirable to have systems and methods for adaptively generating coefficients for continuous time equalizers that overcome the disadvantages of the prior art as discussed, such as generating coefficients with high adaptation loop gain and requisite time-constant, mitigating offsets, and maintaining closed-loop stability.

SUMMARY

According to one aspect of the invention, an adaptive coefficient generator utilizes a first adaptive correction signal for a first correction and a second adaptive correction signal for a second more precise correction. The adaptive correction signals for offset correction can be a current or voltage. The first adaptive correction signal is set at the power-up of the IC powering down the input stage to ensure that coefficient values appearing at the output of the coefficient generator are due to the device offsets only. This is done by maintaining the second adaptive correction signal constant, such as setting it to zero, and adjusting the first signal until the magnitude of the coefficient is minimized. The second adaptive correction signal is then set by maintaining the first adaptive correction signal at its set value by adjusting the second signal until the magnitude of the coefficient is minimized. This process is performed for each of the n coefficients, from $c_0$ to $c_{n-1}$, and in one embodiment, each coefficient is generated by a separate circuit.

In one embodiment, the adaptive coefficient generator includes a multiplier for multiplying an input signal and an error signal. The output from the multiplier is added to the first adaptive correction signal and the sum multiplied by a variable gain. The resulting signal is then low pass filtered before passing through a first variable gain stage. The output of the gain stage is added to the second adaptive correction signal, and the summed output signal is passed through additional variable gain stages, with the number of gain stages dependent on the gain requirement for the coefficient adaptation. If the gain requirement is very high and additional numbers of gain stages are required, by extending the same methodology, additional adaptive correction signals can be added at the output of successive gain stages to obtain more precision in offset correction.

The coefficient signals from the gain stages are input to an analog to digital converter (ADC), which converts the analog signal to a digital signal. The digital signal is then input to a micro-controller, which adjusts the first and second adaptive correction signal based on the magnitude of the input coefficient signal. The output of the microcontroller is converted to an analog representation of the first or second correction signal, such as a voltage or current, which is then fed back and added to the output of the multiplier or the first variable gain stage, respectively.

The first correction signal provides a correction range to a first precision, e.g., 5 bits (or 6 bit including sign). The second correction signal provides a more precise correction range to the first precision so that two 5-bit precision signals can achieve a 10-bit precision if only using a single correction signal. Thus, the first correction signal "sees" the maximum gain for the adaptive coefficient generator and is used as a "range" DAC, i.e., it cancels the maximum probable offset, but the resolution is coarse. The second correction signal is used to reduce the residual offset, i.e., it is used as a "resolution" DAC. In other embodiments, three or more correction signals can be used, one after each variable gain stage to provide additional precision as needed.

In one embodiment, the coefficients are set by first configuring the dispersion compensation electronics (DCE) in open loop, i.e., disable the coefficient adaptation, and then turning off the input signal or power-down the input stage, leaving only DC offsets. Next, the magnitude of the coefficient is monitored, such as by a microcontroller, where the first correction signal is varied, while the second correction signal is held constant, such as by setting it to zero. When the magnitude of the coefficient is minimized, the first control signal is set. The second correction signal is then determined by fixing the first correction signal at its set value, and adaptively varying the second correction signal until the magnitude of the coefficient is minimized.

In embodiments where the gain requirement is higher, more gain stages are needed and more than two correction signals are used for coefficient generation, with correction signals set sequentially from the first to the last. As each correction signal is set, it is maintained at its set value while the next correction signal is adaptively or iteratively being set, with the subsequent correction signals set to zero. In this way, each correction signal being set results in a higher precision of the adaptive coefficient generator.

In one embodiment, the adaptive coefficient generator is used to generate coefficients, such as in the range of [0,1] or [−1, 1], for use in a feedforward filter of a least-mean-square (LMS) based continuous-time equalizer.

Thus, the present invention 1) allows coefficients to be generated with high adaptation loop gain and requisite time-constant, 2) mitigates offsets, which can be a big problem especially in deep submicron CMOS implementations, and 3) maintains closed-loop stability. Different coefficients can be generated with different gains and time constants. Furthermore, the present invention implements a tap-leakage algorithm, such as in equation (2) above, and reduces the negative effects of coefficient drift by allowing a low adaptation gain on center coefficients. Note that lower gain means they are more "sluggish".

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

According to one aspect of the invention, an adaptive coefficient generator, such as for use in a continuous-time equalizer, multiplies an input signal and an error signal and then uses at least two feedback correction signals to minimize the coefficients.

Figure 1:
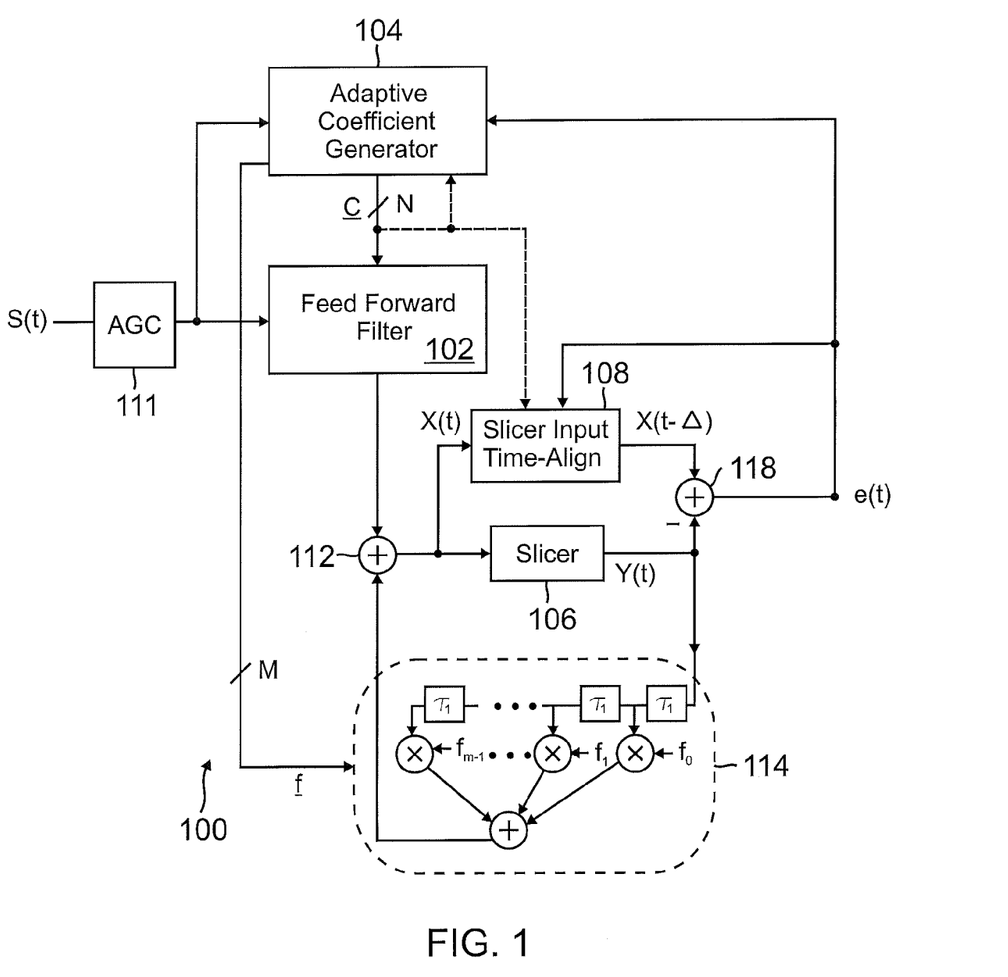
FIG. 1 shows a block diagram of a portion of a transceiver for use with an adaptive coefficient generator according to one aspect of the present invention.

FIG. 1 is a block diagram of a continuous-time least mean square (LMS) based adaptive equalizer 100, where an adaptive coefficient generator 104 according to one embodiment of the invention is used. LMS-based equalizer 100 also includes a feedforward filter 102, an output signal slicer 106, and a slicer input time-align circuit 108. Adaptive equalizer 100 may also include an adaptive automatic gain control (AGC) circuit 111, which provides the necessary gain for small signals. Thus, after a signal is output from AGC circuit 111, the signal is within a suitable range that allows the signal to be properly used throughout the rest of the circuit. Adaptive AGCs are known and any such suitable one can be used with the present invention to adaptively provide the proper gain.

Feedforward filter 102 receives an input data signal s(t) and tap coefficients from adaptive coefficient generator 104 and generates an equalized signal, which is input to an adder 112. The other input to adder 112 is the output from a decision feedback equalizer 114, which in one embodiment, includes M delay elements, M multipliers, and one adder.

The feedback signal into adder 112 provides an iterative correction to an error signal e(t) for use by adaptive coefficient generator 104 to generate adaptive tap coefficients. The error signal, processing through adder 118, is the difference between the outputs of slice input time-align circuit 108 and slicer 106, $x(t-\Delta)$ and $y(t)$, respectively. As time passes, the error signal converges until a sufficiently small error signal is obtained through adaptively changing the tap coefficients. The output of slicer 106, along with adaptive coefficients f from adaptive coefficient generator 104, can also be used in M-tap decision feedback equalizer 114 to generate an input to adder 112. Details for a system are described in commonly-owned U.S. patent application Ser. No. 10/614,587, entitled "Channel Monitoring And Identification And Performance Monitoring In A Flexible High Speed Signal Processor Engine", filed Jul. 3, 2003, and Ser. No. 10/426,588, entitled "Adaptation Structure And Methods For Analog Continuous Time Equalizers", filed Apr. 29, 2003, both of which are incorporated by reference by their entirety.

Figure 2:
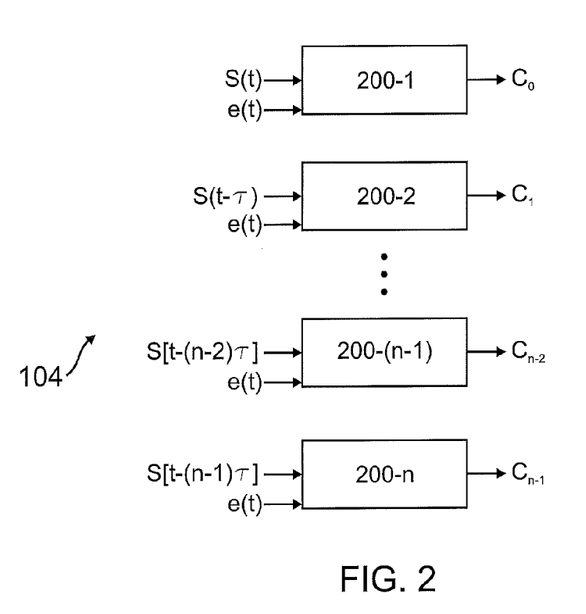
FIG. 2 shows a block diagram of an adaptive coefficient generator for use in the transceiver of FIG. 1 according to one embodiment.

FIG. 2 is a block diagram of one embodiment of adaptive coefficient generator 104 for generating a coefficient vector c (e.g., a tap coefficient vector). Adaptive coefficient generator 104 includes n individual coefficient generator circuits 200, with the first circuit 200-1 generating coefficient $c_0$, second circuit 200-2 generating coefficient $c_1$, and so on, with circuit 200-n generating coefficient $c_{n-1}$.

Figure 3A:
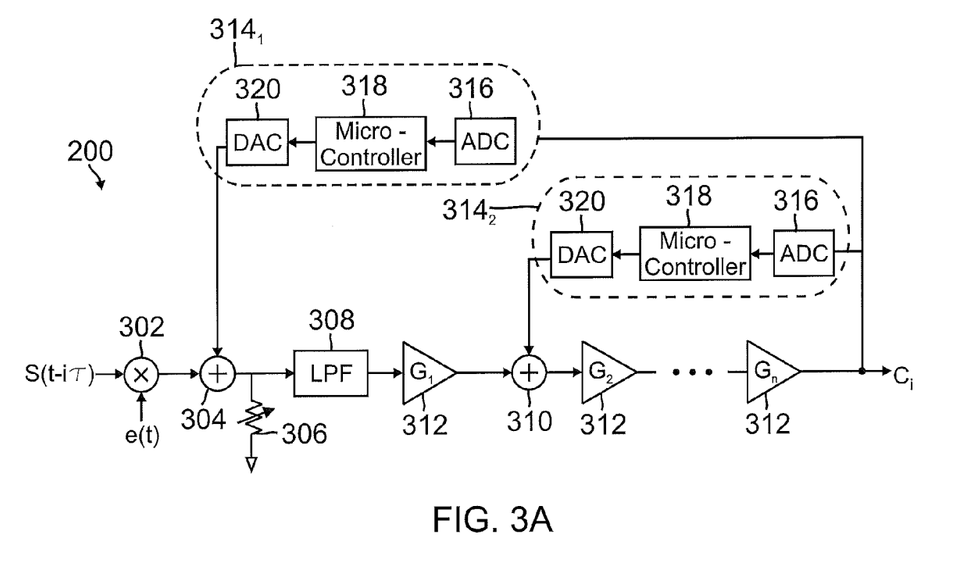
FIG. 3A shows a block diagram of a coefficient generator circuit for use in the adaptive coefficient generator of FIG. 2 according to one embodiment.

FIG. 3A is a block diagram of a generalized $i^{th}$ coefficient generator circuit 200 according to one embodiment. Circuit 200 includes a multiplier 302, first adder 304, a variable gain 306, a variable gain low pass filter (LPF) 308, a second adder 310, a series of i+1 variable gain stages 312, and a series of M micro-controller circuits 314, where each micro-controller circuit 314 includes an analog-to-digital converter (ADC) 316, a microcontroller 318, and a digital-to-analog converter (DAC) 320.

Figure 3B:
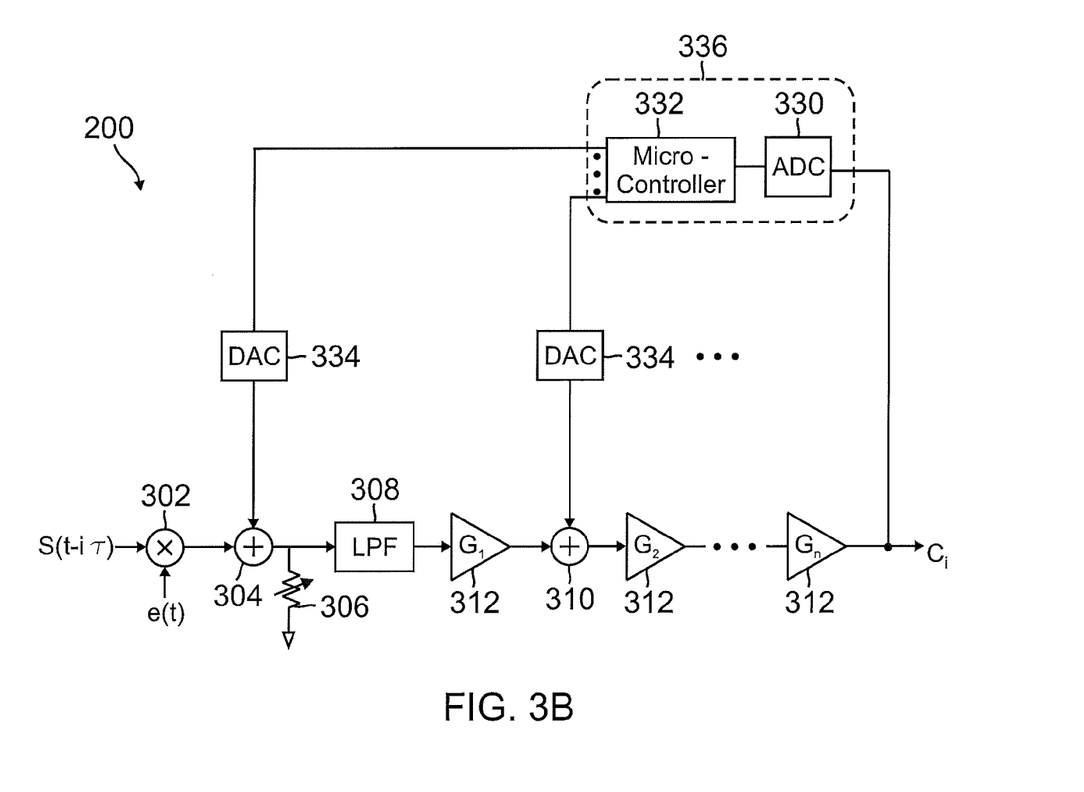
FIG. 3B shows a block diagram of a coefficient generator circuit for use in the adaptive coefficient generator of FIG. 2 according to another embodiment.

FIG. 3B is a block diagram of a generalized $i^{th}$ coefficient generator circuit 200 according to another embodiment. In this embodiment, the series of M micro-controller circuits 314 (from FIG. 3A) are replaced by a single ADC 330 followed by a microcontroller 332, with the output of microcontroller 332 coupled to a series of M DACs 334. ADC 330 and microcontroller 332 can be a single module or circuit 336, which is time-shared by the M DACs, where each DAC 334 can supply a different analog correction voltage or current. In this embodiment, a single ADC/microcontroller 336 is sufficient because the correction is done at power-up and hence time-sharing of the ADC and the microcontroller is possible. Microcontroller 332 has different registers to hold the digital bits for corresponding DACs 334. In either embodiment, the number of micro-controller circuits 314 or the number of DACs 334 depends on the amount of gain required, i.e., the number of variable gain stages.

Input data signal for the $i^{th}$ component $S(t-i\tau)$, after processing by adaptive AGC circuit 111, is multiplied with error signal e(t). $\tau$ is a fixed delay $\tau$, which is typically selected to be less than a symbol period $T_s$, such as half the symbol period. Note that in some embodiments, adaptive AGC circuit 111 may be omitted.

The output of multiplier 302 is a current that is proportional to the error signal e(t). For example, when e(t) is small, indicating a small error for the processed data signal, the magnitude of the multiplier output, e.g., current, will be low. The current is then added to a first correction signal, shown here as $idac_1$ (current from a DAC), from a first one of micro-controller circuit 314. A variable gain G is then applied to the sum by variable gain 306. The gain (and time-constant of the low pass filter) is determined from the adaptation dynamic, e.g., how fast versus to what precision the coefficient convergence is required, how many taps are jointly adapting, and what is the tap spacing. The total gain is broken up into variable gain 306 and variable gain stages 312 because of implementation issues, such as closed loop stability.

For example, if too much gain is in variable gain 306 (e.g., resistors), the phase margin of the adaptation loop and the common-mode feedback (CMFB) loop (not shown) becomes a problem. However, if too small of a gain is in variable gain 306 (requiring additional gain stages), more active circuitry is required, resulting in more noise as well as more parasitic poles, which may hurt stability.

The signal is next passed through low pass filter 308. In one embodiment, LPF 308 has unity DC gain, and the variable resistor shows variable time constant (and hence bandwidth) depending on the criteria discussed above. As an example, for one implementation, with data rate equal to 10 Gbps, the number of taps equal from 8 to 12, and tap spacing equal to T/3, then the time-constant, i.e. RC product of LPF 308, can be approximately 10 μsec. The signal from low pass filter 308 is transmitted through a first one of variable gain stage 312. The output of first variable gain stage $312_1$ is summed with a second correction signal, shown here as $idac_2$, from a second one of micro-controller circuit 314. The summed output signal is passed through a series of i variable gain stages 312 from $312_1$ to $312_i$. The output of the last variable gain stage $312_j$ is the coefficient, e.g., tap coefficient, $c_i$.

ADC 316 and micro-controller circuit 318 are used to cancel or minimize the offsets at the output of coefficient generator 200 only at the power-up of the circuit, as will be discussed in the flow chart of FIG. 4. Once the correction signal (e.g., voltage or current) is computed, the first and second (or more if higher gain desired) DACs for each coefficient generator 200-1 to 200-n are held to these corresponding values throughout the run-time of the equalizer.

Figure 4:
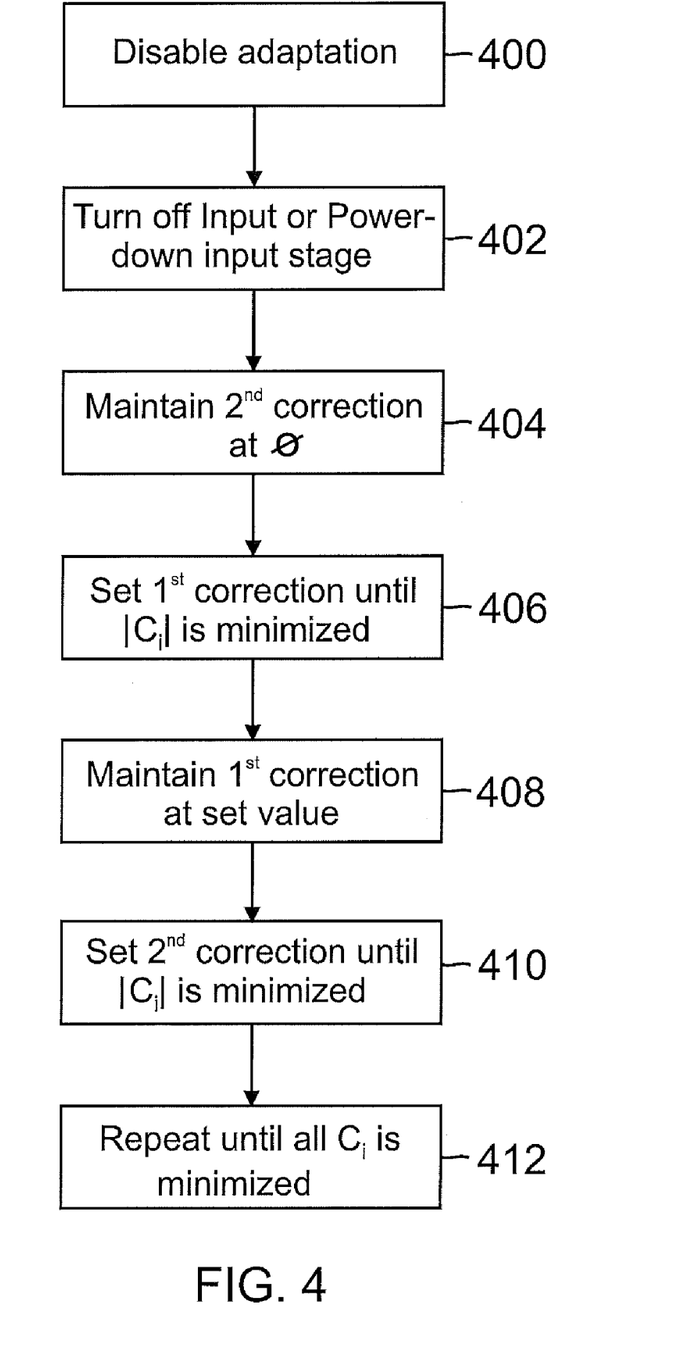
FIG. 4 shows a flow chart for generating coefficients according to one embodiment.

FIG. 4 is a flow chart illustrating operation of coefficient generator circuit 200 according to one embodiment. Reference is also made to FIGS. 1 and 3. First, the dispersion compensation electronics (DCE) is configured in open-loop, i.e., the adaptation is disabled, in step 400. The adaptation can be disabled by powering down the stage in the tap mixers that takes the coefficients $c_i$ as inputs. Commonly-owned U.S. patent application Ser. No. 10/970,471, entitled "Method And Apparatus For Constrained Coefficient Adaptation For Continuous-time Equalizers" provides additional description and is incorporated by reference in its entirety. Next, in step 402, the input signal s(t) is turned off, such as by powering down the input stage, resulting in only DC offsets through the equalizer.

The second correction signal (from micro-controller circuit $314_1$) $idac_2$ is maintained at a constant, such as 0, in step 404. Note that in embodiments where there are more than two correction signals (or equivalently micro-controller circuits), $idac_2$ to $idac_n$ are all maintained at a constant, such as 0. Next, in step 406, the magnitude of coefficient $c_i$ is monitored and the first correction signal or $idac_1$ is adjusted and set by micro-controller circuit $314_1$ until the magnitude of coefficient $c_i$ is minimized. First correction signal $idac_1$ is then maintained, in step 408, at its set value as determined in step 406. The magnitude of coefficient $c_i$ is again monitored and the second correction signal $idac_2$ is adjusted and set, in step 410, by micro-controller circuit $314_2$ until the magnitude of coefficient $c_i$ is again minimized. This process continues until all correction signals ($idac_1$ to $idac_k$ are set in step 412. At that point, coefficient $c_i$ is minimized, corresponding in the error being minimized. The process is repeated for each of the n−1 remaining adaptive coefficient generators.

Figure 5:
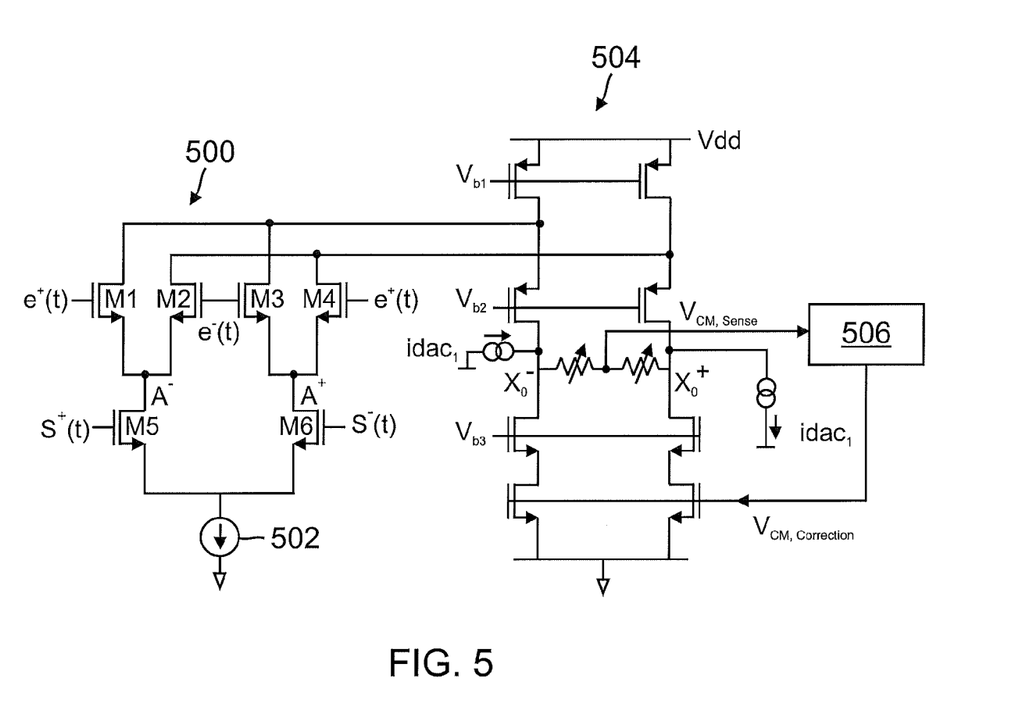
FIGS. 5-7 are circuit diagrams of portions of the coefficient generator circuit of FIG. 3 according to one embodiment.
Figure 6:
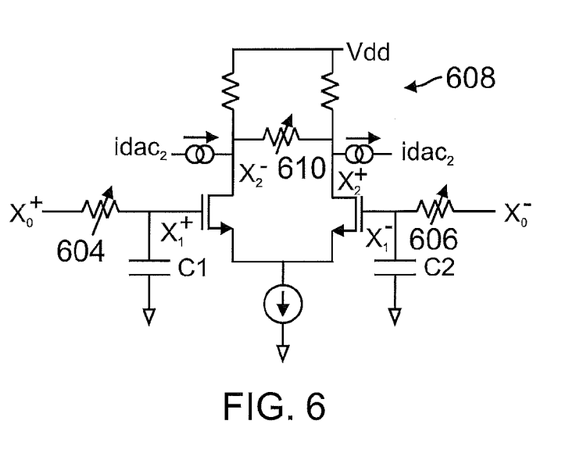
Figure 7:
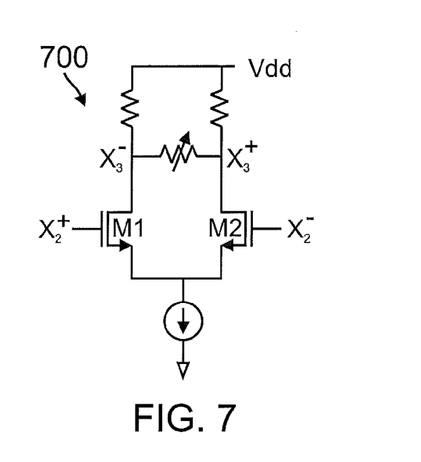

FIGS. 5-7 are circuit diagrams of various blocks of the coefficient generator circuit 200 of FIG. 2, according to one embodiment. FIG. 5 shows one embodiment of multiplier 302, adder 304, and variable gain 306 having a first portion 500, a second portion 504, and a common-mode feedback (CMFB) circuit 506. First portion 500 includes transistor pairs M1 and M2, M3 and M4, and M5 and M6, along with current source 502, to form multiplier 302. Differential error signal e(t) and input data signal s(t) are input to the appropriate transistors for multiplication of the two signals. The product signal is then introduced with first correction signal idac1 via second portion 504, where a variable gain is applied. CMFB circuit 506 deterministically defines the common mode at the $x_0^+$ and $x_0^-$ points. CMFB circuits are known, and many different implementations may be suitable for use in the present invention.

Note that the multiplier (first portion 500) shown in FIG. 5 is a standard Gilbert cell multiplier, with the output of the multiplier used as an input to second portion 504. The Gilbert cell multiplier is used in the present invention as a high speed multiplier for multiplying two very high bandwidth data and error signals s(t) and e(t), respectively. Consequently, there is an inherent delay from the data port going into the error port due to unwanted parasitic poles at nodes $A^-$ and $A^+$ as shown in FIG. 5. This delay needs to be minimized by carefully maintaining high current-density in the devices. Furthermore, any residual delay needs to be accounted for while aligning the delays in data signal s(t) and error signal e(t) before feeding in the multiplier circuit. Second portion 504 forms adder 304 and variable gain 306 circuits according to one embodiment.

FIG. 6 shows one embodiment of low pass filter 308, first variable gain stage 312, and adder 310. The output signal $x_0$ of the circuit of FIG. 5 is input to a first portion, which includes a variable resistance 604, 606 and capacitors C1, C2 to form low pass filter 308. The output signal ($x_1$) of the low pass filter is introduced to second correction signal idac2 in a second portion 608. Second portion 608 also includes a variable gain 610 and forms first variable gain stage 312 and adder 310 circuits according to one embodiment. FIG. 7 shows one embodiment of a variable gain circuit 700 that can be used as subsequent variable gain circuits 312. The output signal $x_2$ of second portion 608 is applied to transistors M1 and M2, a variable gain is applied, and an output signal x3 is generated. Output signal x3 can then be applied to additional variable gain circuits or added to additional correction signals as needed.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. An adaptive coefficient generator circuit, comprising:
   a multiplier configured to receive an input data signal and a feedback error signal;
   a first adder configured to receive a first correction signal and the output from the multiplier, wherein the first correction signal adjusts offset to a first precision;
   a first variable gain stage configured to receive the output from the first adder;
   a second adder configured to receive a second correction signal and the output from the first adder, wherein the second correction signal adjusts offset to a second precision greater than the first precision;
   a second variable gain stage configured to receive the output of the second adder, wherein the output of the second variable gain stage represents a coefficient; and
   a first microcontroller circuit coupled to the output of the adaptive coefficient generator circuit and the first adder.

2. The circuit of claim 1, further comprising a low pass filter coupled between the first adder and the first variable gain stage.

3. The circuit of claim 1, further comprising a third adder configured to receive a third correction signal and the output from the second variable gain stage, wherein the third correction signal adjusts offset to a third precision greater than the second precision.

4. The circuit of claim 1, further comprising a second microcontroller circuit coupled between the output of the adaptive coefficient generator circuit and the second adder.

5. The circuit of claim 1, wherein the first microcontroller circuit comprises:
   an analog to digital converter configured to receive the output of the adaptive coefficient generator circuit;
   a micro-controller configured to monitor the output of the adaptive coefficient generator circuit and change the first correction signal to minimize the magnitude of the coefficient; and a digital to analog converter coupled between the microcontroller and the first adder.

6. The circuit of claim 4, wherein the second microcontroller circuit comprises:
an analog to digital converter configured to receive the output of the adaptive coefficient generator circuit;
a micro-controller configured to monitor the output of the adaptive coefficient generator circuit and change the second correction signal to minimize the magnitude of the coefficient; and
a digital to analog converter coupled between the microcontroller and the second adder.

7. An adaptive coefficient generator circuit, comprising:
a multiplier configured to receive an input data signal and a feedback error signal;
a first adder configured to receive a first correction signal and the output from the multiplier, wherein the first correction signal adjusts offset to a first precision;
a first variable gain stage configured to receive the output from the first adder;
a second adder configured to receive a second correction signal and the output from the first adder, wherein the second correction signal adjusts offset to a second precision greater than the first precision;
a second variable gain stage configured to receive the output of the second adder, wherein the output of the second variable gain stage represents a coefficient;
an analog to digital converter (ADC) coupled to the output of the adaptive coefficient generator circuit; and
a micro-controller configured to monitor the output of the adaptive coefficient generator and change its output to minimize the magnitude of the coefficient, where the micro-controller is coupled to receive the output of the ADC.

8. The circuit of claim 7, further comprising at least two digital to analog converters (DACs), wherein the input of each DAC is coupled to the output of the micro-controller, and wherein the output of the first DAC is coupled to an input of the first adder, and the output of the second DAC is coupled to an input of the second adder.

9. The circuit of claim 1, wherein the coefficient is a tap coefficient for use with a feedforward filter.

10. The circuit of claim 1, wherein the coefficient is a tap coefficient for use with a decision feedback equalizer.

11. The circuit of claim 1, wherein the first and second correction signals are currents.

12. An adaptive coefficient generator, comprising:
n−1 coefficient generator circuits, wherein each coefficient generator circuit generates one coefficient ci, where i=1 to n−1, where n is an integer greater than 1, and each coefficient generator circuit comprises:
a multiplier configured to receive an input data signal s(t-iτ) and a feedback error signal e(t), where τ is a delay;
a first adder configured to receive a first correction signal and the output from the multiplier, wherein the first correction signal adjusts offset to a first precision;
a first variable gain stage configured to receive the output from the first adder;
a second adder configured to receive a second correction signal and the output from the first adder, wherein the second correction signal adjusts offset to a second precision greater than the first precision;
a second variable gain stage configured to receive the output of the second adder; and
i−2 sequentially coupled variable gain stages, wherein the coefficient ci is output from the last variable gain stage, wherein each coefficient generator circuit further comprises a first microcontroller circuit coupled between the output of the last variable gain stage and the first adder.

13. The generator of claim 12, wherein each coefficient generator circuit further comprises a low pass filter coupled between the first adder and the first variable gain stage.

14. The generator of claim 12, wherein each coefficient generator circuit further comprises a second microcontroller circuit coupled between the output of the last variable gain stage and the second adder.

15. The generator of claim 12, wherein the first microcontroller circuit comprises:
an analog to digital converter configured to receive the output of the last variable gain stage;
a micro-controller configured to monitor the output of the last gain stage and change the first correction signal to minimize the coefficient; and
a digital to analog converter coupled between the microcontroller and the first adder.

16. The generator of claim 14, wherein the second microcontroller circuit comprises:
an analog to digital converter configured to receive the output of the last variable gain stage;
a micro-controller configured to monitor the output of the last variable gain stage and change the second correction signal to minimize the coefficient; and
a digital to analog converter coupled between the microcontroller and the second adder.

17. An adaptive coefficient generator, comprising:
n−1 coefficient generator circuits, wherein each coefficient generator circuit generates one coefficient ci, where i=1 to n−1, where n is an integer greater than 1, and each coefficient generator circuit comprises:
a multiplier configured to receive an input data signal s(t-iτ) and a feedback error signal e(t), where τ is a delay;
a first adder configured to receive a first correction signal and the output from the multiplier, wherein the first correction signal adjusts offset to a first precision;
a first variable gain stage configured to receive the output from the first adder;
a second adder configured to receive a second correction signal and the output from the first adder, wherein the second correction signal adjusts offset to a second precision greater than the first precision;
a second variable gain stage configured to receive the output of the second adder; and
i−2 sequentially coupled variable gain stages, wherein the coefficient ci is output from the last variable gain stage,
wherein each coefficient generator circuit comprises:
an analog to digital converter (ADC) coupled to the output of the last variable gain stage; and
a micro-controller configured to monitor the output of the last variable gain stage and change its output to minimize the coefficient, where the micro-controller is coupled to receive the output of the ADC.

18. The generator of claim 17, wherein each coefficient generator circuit further comprises at least two digital to analog converters (DACs), wherein the input of each DAC is coupled to the output of the micro-controller, and wherein the output of the first DAC is coupled to an input of the first adder, and the output of the second DAC is coupled to an input of the second adder.

19. An adaptive coefficient generator, comprising:
n−1 coefficient generator circuits, wherein each coefficient generator circuit generates one coefficient ci, where i=1 to n−1, where n is an integer greater than 1, and each coefficient generator circuit comprises:

a multiplier configured to receive an input data signal $s(t-i\tau)$ and a feedback error signal $e(t)$, where $\tau$ is a delay;

a first adder configured to receive a first correction signal and the output from the multiplier, wherein the first correction signal adjusts offset to a first precision;

a first variable gain stage configured to receive the output from the first adder;

a second adder configured to receive a second correction signal and the output from the first adder, wherein the second correction signal adjusts offset to a second precision greater than the first precision;

a second variable gain stage configured to receive the output of the second adder; and i–2 sequentially coupled variable gain stages, wherein the coefficient ci is output from the last variable gain stage, wherein $\tau$ is a delay that is less than the symbol period.

20. The generator of claim 12, wherein the coefficients are used in continuous time least mean square error equalizers.

21. The generator of claim 12, wherein the first and second correction signals are currents.

* * * * *